(12) United States Patent
Lefebvre et al.

(10) Patent No.: US 11,664,558 B2
(45) Date of Patent: May 30, 2023

(54) LITHIUM ION BATTERY SEPARATOR

(71) Applicant: Arkema Inc., King of Prussia, PA (US)

(72) Inventors: Amy A. Lefebvre, Pottstown, PA (US); Thomas Fine, Lyons (FR); James F. Coffey, Broomall, PA (US); Ramin Amin-Sanayei, Malvern, PA (US); Wensheng He, Wayne, PA (US)

(73) Assignee: Arkema Inc., King of Prussia, PA (US)

( * ) Notice: Subject to any disclaimer, the term of this patent is extended or adjusted under 35 U.S.C. 154(b) by 359 days.

(21) Appl. No.: 16/760,193

(22) PCT Filed: Oct. 30, 2018

(86) PCT No.: PCT/US2018/058075
§ 371 (c)(1),
(2) Date: Apr. 29, 2020

(87) PCT Pub. No.: WO2019/089492
PCT Pub. Date: May 9, 2019

(65) Prior Publication Data
US 2021/0184311 A1    Jun. 17, 2021

Related U.S. Application Data

(60) Provisional application No. 62/578,701, filed on Oct. 30, 2017.

(51) Int. Cl.
*H01M 50/426*    (2021.01)
*H01G 11/52*    (2013.01)
(Continued)

(52) U.S. Cl.
CPC .......... *H01M 50/426* (2021.01); *H01G 11/52* (2013.01); *H01M 8/1048* (2013.01);
(Continued)

(58) Field of Classification Search
CPC ............. H01M 50/426; H01M 50/446; H01M 50/443; H01M 50/449; H01M 8/1048; H01M 10/0525; H01G 11/52
See application file for complete search history.

(56) References Cited

U.S. PATENT DOCUMENTS

2006/0008700 A1    1/2006  Yong et al.
2009/0111025 A1    4/2009  Lee et al.
(Continued)

FOREIGN PATENT DOCUMENTS

| GB | 1148852 A | 4/1969 |
| JP | 2015512124 A | 4/2015 |
| JP | 2017098203 | 6/2017 |

OTHER PUBLICATIONS https://precision-ceramics.com/materials/silicon-nitride/#:~:text=Silicon%20Nitride%20(Si3N4)%20has%20the%20most%20versatile,thermal%20shock%20and%20impact%20resistance. (Year: 2022).*

*Primary Examiner* — Sarah A. Slifka
*Assistant Examiner* — Rachel L Zhang
(74) *Attorney, Agent, or Firm* — Joanne Rossi

(57) ABSTRACT

The invention relates to a separator for non-aqueous-type electrochemical devices that has been coated with a polymer binder composition having polymer particles of two different sizes, one fraction of the polymer particles with a weight average particle size of less than 1.5 micron, and the other fraction of the polymer particles with a weight average particle size of greater than 1.5 microns. The bi-modal polymer particles provide an uneven coating surface that creates voids between the separator and adjoining electrodes, allowing for expansion of the battery components during the charging and discharging cycle, with little or no increase in the size of the battery itself. The bi-modal polymer coating can be used in non-aqueous-type electro- (Continued)

chemical devices, such as batteries and electric double layer capacitors.

12 Claims, 2 Drawing Sheets

(51) Int. Cl.
*H01M 50/443* (2021.01)
*H01M 50/446* (2021.01)
*H01M 50/449* (2021.01)
*H01M 8/1048* (2016.01)
*H01M 50/423* (2021.01)
*H01M 50/42* (2021.01)
*H01M 50/451* (2021.01)
*H01M 50/414* (2021.01)
*H01M 10/0525* (2010.01)
*H01M 50/454* (2021.01)

(52) U.S. Cl.
CPC ......... *H01M 50/414* (2021.01); *H01M 50/42* (2021.01); *H01M 50/423* (2021.01); *H01M 50/443* (2021.01); *H01M 50/446* (2021.01); *H01M 50/451* (2021.01); *H01M 10/0525* (2013.01); *H01M 50/454* (2021.01)

(56) References Cited

U.S. PATENT DOCUMENTS

| | | |
|---|---|---|
| 2009/0111026 A1 | 4/2009 | Kim et al. |
| 2010/0330268 A1 | 12/2010 | Jiang |
| 2012/0189987 A1 | 1/2012 | Hermansson et al. |
| 2012/0189897 A1 | 7/2012 | Wakizaka et al. |
| 2015/0004456 A1 | 1/2015 | Okuno et al. |
| 2015/0030906 A1 | 1/2015 | Amin-Sanayei et al. |
| 2015/0056491 A1 | 2/2015 | Zhao et al. |
| 2015/0240039 A1* | 8/2015 | Katsuda .............. C08J 5/18 521/139 |
| 2015/0311490 A1 | 10/2015 | Murase et al. |
| 2015/0372277 A1 | 12/2015 | Honda |
| 2015/0380706 A1 | 12/2015 | Hyung-Kyun et al. |
| 2016/0086742 A1 | 3/2016 | Amin-Samayei et al. |
| 2016/0133988 A1 | 5/2016 | Amin-Samayei et al. |
| 2016/0359155 A1 | 12/2016 | Yong et al. |
| 2017/0179456 A1 | 6/2017 | Byung-Soo et al. |

* cited by examiner

LITHIUM ION BATTERY SEPARATOR

CROSS-REFERENCE TO RELATED APPLICATIONS

This application is a national stage application under 35 USC § 371 of PCT International Application PCT/US2018/058075 filed Oct. 30, 2018, which claims priority based on U.S. Provisional Application 62/578,701 filed Oct. 30, 2017, the contents of each are herein incorporated by reference in their entities.

FIELD OF THE INVENTION

The invention relates to a separator for non-aqueous-type electrochemical devices that has been coated with a polymer binder composition having polymer particles of two different sizes, one fraction of the polymer particles with a weight average particle size of less than 1.5 micron, and the other fraction of the polymer particles with a weight average particle size of greater than 1.5 microns. The bi-modal polymer particles provide an uneven coating surface that creates voids between the separator and adjoining electrodes, allowing for expansion of the battery components during the charging and discharging cycle, with little or no increase in the size of the battery itself which results in an improved performance. The bi-modal polymer coating can be used in non-aqueous-type electrochemical devices, such as batteries and electric double layer capacitors.

BACKGROUND OF THE INVENTION

Lithium batteries, including lithium metal batteries, lithium ion batteries, lithium polymer batteries, and lithium ion polymer batteries are finding increased usage due to the desire to increase voltages and energy densities compared to conventional batteries using aqueous electrolytes (such as Ni-MH batteries).

The lithium ion battery consists of stacks of anodes and cathodes, each set of anode and cathode separated by a separator to prevent short circuiting. During manufacture, the anode, cathode and separators must be aligned, and they must remain aligned in use.

Pouch cell lithium ion batteries were introduced in 1995 as a flexible, lightweight alternative to metallic cylinder batteries. These highly efficient batteries are used in consumer electronic, military, and automotive applications, and are preferred due to their low packaging weight and high rate of heat dissipation. Because they are thin and flexible, pouch cell lithium ion batteries are the preferred choice in high-end consumer electronics.

The separator forms a barrier between the anode and the cathode in the battery. It was found that the bound inorganic particles on a porous organic separator increased the volume of space that a liquid electrolyte infiltrates, resulting in improved ionic conductivity.

Current lithium ion batteries and lithium ion polymer batteries typically use polyolefin-based separators, either alone or coated with aluminum oxide or ceramic particles, to improve heat stability, and to prevent a short circuit between a cathode and an anode. These polyolefin-based separators have a melting point of 140° C. or less, they may shrink melt when the temperature of a battery is increased by internal and/or external factors, and can short-circuit. The short circuit can lead to accidents, such as explosion or fire in a battery, caused by the emission of electric energy. As a result, it is necessary to provide a separator that does not undergo heat shrinking at high temperature.

To improve heat and chemical resistance, fluoropolymers have been used as the separator itself, or have been coated onto the separator as a binder. Such a coated separator is described in US 2015-0030906. These fluoropolymer binders and adhesives solve the problem found in non-fluoropolymer adhesives, which tend to oxidize at the cathode producing off-gassing and swelling of the battery.

Battery separators have been coated with polymers and inorganic particles, the inorganic particles providing space between the separator and adjacent electrode, to allow for some expansion of the battery components. Separators coated with polyvinylidene fluoride (PVDF) as a binder for inorganic particles in a solvent coating are described in U.S. Pat. Nos. 7,662,517, 7,704,641, and US 2010/0330268. U.S. Pat. No. 9,548,167, US 2016/0133988 and US 2015-0030906 describe aqueous based PVDF separator coatings.

Separator coating may be solvent or aqueous based. Aqueous coatings are preferred for both environmental reasons, and for the ability to retain discrete polymer particles that result in a dried, porous coating—rather than dissolved polymer that forms a continuous film. Waterborne slurries effective in separator coating, have the following characteristics including: a) stability of the waterborne fluoropolymers: dispersion, having sufficient shelf-life, b) stability of the slurry after formulation and admixing optionally the powdery material, c) appropriate viscosity of the slurry to facilitate good aqueous casting, and d) sufficient adhesion to the separator which is non-reversible after drying, e) and foaming porous coating on polyolefin separator upon drying.

A separator coating containing two different polymers, with one having polar groups for hydrophilic functionality, is described in U.S. Pat. No. 7,709,152.

US 2012/0189897 describes the use of two different polymer particles in a battery separator coating, particles A having a number average particle size of from 400 nm to 10 microns with a Tg>65° C., and particles B with a number average particle size of from 40 to 300 nm and a Tg of <15° C.

One problem with batteries, and especially with pouch-type batteries, is that during charging, the electrodes, especially the anode, increases in volume due to the increase in charge. The increase in volume of the electrodes increases the overall battery thickness, as there is little or no space within the battery for expansion to occur. This often results in deformation of the battery.

US 2015/0056491 describes a separator coating that contains inorganic particles, an adhesive, and organic polymer particle that have been swelled to differing degrees by a plasticizer (no description of any specific particle sizes provided). The polymer particles must be pre-swelled with plasticizer to differing levels, adding processing steps, and the plasticizer can migrate out of the polymer particles during battery use.

Surprisingly, it has now been found that internal space can be created within the battery for internal expansion, by using at least two different size polymer binder particles, to create an irregular surface coating (irregular surface morphology). The irregular surface provides space for internal expansion minimizing the change in the battery thickness, thus facilitating better battery performance.

SUMMARY OF THE INVENTION

The invention relates to a porous separator for an electrochemical device, having directly coated thereon a dried coating composition having an uneven morphology, wherein said dried coating composition comprises:

a) discrete polymer particles of at least two different weight average particle sizes, one smaller polymer particle fraction having an average particle size of less than 1.5 micron, the other larger polymer particle fraction having a weight average particle size of greater than 1.5 microns; wherein said large and small polymer particles are each independently selected from the group consisting of fluoropolymers, polyamides, polyether ether ketone, poly(meth)acrylates, polyether ketone ketone, and polyesters, and b) optionally inorganic, electrochemically stable particles.

The invention also relates to a battery, capacitor or membrane electrode assembly, using such a coated separator.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A porous separator for an electrochemical device, having directly coated thereon a dried coating composition having an uneven surface, wherein said dried coating composition comprises:

a) discrete polymer particles of at least two different weight average particle sizes, one smaller polymer particle fraction having an average particle size of less than 1.5 micron, the other larger polymer particle fraction having a weight average particle size of greater than 1.5 microns; wherein said large and small polymer particles are each independently selected from the group consisting of fluoropolymers, polyamides, polyether ether ketone, polyether ketone ketone, polyesters, and poly(meth)acrylates, and b) optionally inorganic, electrochemically stable particles.

2. The porous separator of aspect 1, wherein the smaller polymer particle fraction has an average particle size of less than 1.0 micron, the other larger polymer particle fraction has a weight average particle size of greater than 2.0 microns 3. The porous separator of either aspect 1 or 2, wherein the ratio of the less than 1.5 micron particles to the greater than 1.5 micron particles is at least 1:1, preferably 2:1, more preferably 3:1.

4. The porous separator of any of aspects 1 to 3, wherein said large and small polymer particles are the same or different chemistries.

5. The porous separator of any of aspects 1 to 4, wherein the smaller particles comprise homopolymers or copolymers of polyvinylidene fluoride.

6. The porous separator of any of aspects 1 to 5, wherein both said large and said small polymer particles are polyvinylidene fluoride homopolymers or copolymers comprising at least 70 weight percent of vinylidene fluoride monomer units.

7. The porous separator of any of aspects 1 to 6, wherein said small particles have a weight average particle size of from 20 nm to 500 nm, preferably from 30 nm to 300 nm.

8. The porous separator of any of aspects 1 to 7, wherein said large particles have a lower average Tg than the smaller particles.

9. The porous separator of any of aspects 1 to 8, wherein said small particles comprise functional polyvinylidene fluoride.

10. The porous separator of aspects 1 to 9, wherein said dried coating composition has 0.5 to 50 area percent of the surface comprising large particles, preferably 1 to 20 area percent, and more preferably 1 to 10 area percent.

11. The porous separator of aspects 1 to 10, wherein electrochemically stable inorganic particles are present at from 50 to 99 weight percent based on the total of polymer solids and inorganic particles, and said inorganic particles are selected from the group consisting of $BaTiO_3$, $Pb(Zr,Ti)O_3$, $Pb_{1-x}La_xZr_yO_3$ ($0<x<1$, $0<y<1$), $PBMg_3Nb_{2/3})_3$, $PbTiO_3$, hafnium (HfO, $HfO_2$), $SrTiO_3$, $SnO_2$, $CeO_2$, MgO, NiO, CaO, ZnO, $Y_2O_3$, $Al_2O_3$, $TiO_2$, $SiO_2$, SiC, $ZrO_2$, boron silicate, $BaSO_4$, nano-clays, ceramics, or mixtures thereof.

12. The porous separator of aspects 1 to 11, wherein said dry separator coating has a thickness of from 0.5 to 15 microns, preferably from 1 to 8 microns, and more preferably from 2 to 4 microns.

13. A battery, capacitor, electric double layer capacitor, membrane electrode assembly (MEA) or fuel cell comprising the porous separator of claim 1.

DETAILED DESCRIPTION OF THE INVENTION

Technical Problem

Figure 1:
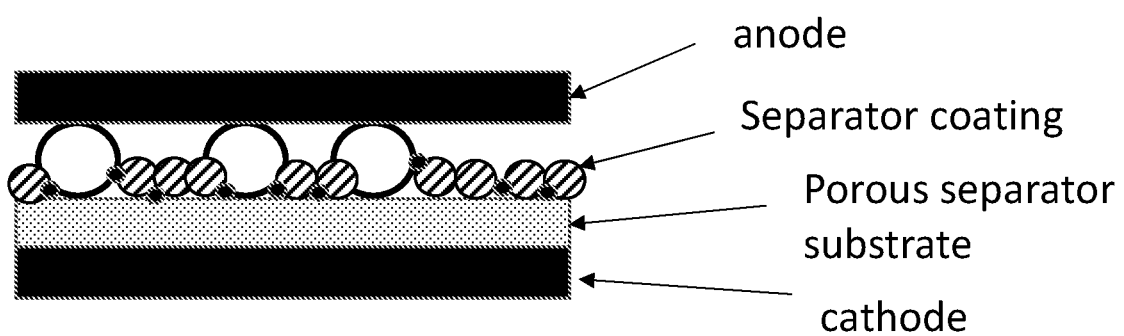
FIG. 1 depicts a battery configuration, with a separator coating containing inorganic particles, large polymer particles and small polymer particles.

The present invention is designed to solve the problems of the prior art, and therefore it is an object of the invention to provide void space between a battery separator and battery electrodes, allowing for expansion of the battery components during charge/discharge cycling, with little or no expansion of the outer dimensions of the battery.

Technical Solution

In order to accomplish the objective, the present invention provides a separator coating having at least two different average size polymer particles, creating an irregular surface on the separator.

"Copolymer" is used to mean a polymer having two or more different monomer units. "Polymer" is used to mean both homopolymer and copolymers. Polymers may be straight chain, branched, star comb, block, or any other structure. The polymers may be homogeneous, heterogeneous, and may have a gradient distribution of co-monomer units. All references cited are incorporated herein by reference. As used herein, unless otherwise described, percent shall mean weight percent. Unless otherwise stated, molecular weight is a weight average molecular weight as measured by GPC, using a polymethyl methacrylate standard. In cases where the polymer contains some cross-linking, and GPC cannot be applied due to an insoluble polymer fraction, soluble fraction/gel fraction or soluble faction molecular weight after extraction from gel is use.

Separator Coating Composition:

The battery separator coating composition includes at least two different polymer particles of different average particle size, optionally inorganic electrochemically stable particles, and optionally other additives, in a solvent, which is preferably water.

Polymer Binder Particles

The polymer binder used are not particularly limited, as long as they can withstand the harsh environment within the battery and can be readily processed into a coating. Preferred polymers include, but are not limited to polyamides, fluoropolymers, polyether ketone ketone, polyether ether ketone, and polyesters. Poly(meth)acrylates could also be used as binder particles—especially for the larger size polymer particles. The poly(meth)acrylates preferable have a Tg of less than 60° C., preferably less than 50° C., and more preferably less than 25° C. All of the binder polymers preferably have a Tg of less than 60° C., and preferably less than 35° C. The binder particles could also be acrylic-modified fluoropolymer hybrids. In one embodiment, the particles could be porous, providing better ion transfer.

In a preferred embodiment, the small particle size binder, is a polyvinylidene fluoride homopolymer or copolymer. The term "vinylidene fluoride polymer" (PVDF) used herein includes both normally high molecular weight homopolymers, copolymers, and terpolymers within its meaning. Copolymers of PVDF are particularly preferred, as they are softer—having a lower Tm, melting point and a reduced crystalline structure. Such copolymers include those containing at least 50 mole percent, preferably at least 75 mole %, more preferably at least 80 mole %, and even more preferably at least 85 mole % of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride. Particularly preferred are copolymers composed of from at least about 70 and up to 90 mole percent vinylidene fluoride, and correspondingly from 10 to 30 mole percent hexafluoropropene. Terpolymers of vinylidene fluoride, hexafluoropropene and tetrafluoroethylene are also representatives of the class of vinylidene fluoride copolymers, embodied herein.

In one embodiment, up to 20%, and preferably up to 15%, by weight of hexafluoropropene (HFP) units and 80%, preferably 85%, by weight or more of VDF units are present in the vinylidene fluoride polymer. It is desired that the HFP units be distributed as homogeneously as possible to provide PVDF-HFP copolymer with excellent dimensional stability in an end-use environment—such as in a battery.

The copolymer of PVDF for use in the separator coating composition preferably has a high molecular weight. By high molecular weight, as used herein, is meant PVDF having a melt viscosity of greater than 1.0 kilopoise, preferably greater than 5 kilopoise, more preferably greater than 10 kilopoise, and even greater than 20 kilopoise, according to ASTM method D-3835 measured at 450° F. and 100 $sec^{-1}$.

The PVDF may also be functionalized for improved adhesion. Functionalization can occur by use of a functional comonomer, or by the use of a functional chain transfer agents, such as polyacrylic acid and others, as described in U.S. 62/483,536.

The copolymer of PVDF used in the invention is preferably prepared by aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent (CTA), is then introduced into the reactor, the reactor temperature raised to the desired level and vinylidene fluoride and one or more comonomers is fed into the reactor. Once the initial charge of monomers are introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically, the temperature will be from about 30° to 150° C., preferably from about 60° to 110° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably, for regulatory reasons, the PVDF emulsion of the invention is made without fluorinated surfactants. Non-fluorinated surfactants useful in the PVDF polymerization could be both ionic and non-ionic in nature including, but are not limited to, 3-allyloxy-2-hydroxy-1-propane sulfonic acid salts, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent, and having a weight average particle size of less than 1 micron, preferably less than 500 nm, preferably less than 400 nm, and more preferably less than 300 nm. The weight average particle size is generally at least 20 nm and preferably at least 50 nm. The composition of the invention contains 2 to 150 parts by weight of PVDF copolymer binder particles per 100 parts of water, preferably 1 to 25 parts by weight. Additional adhesion promoters may also be added to improve the binding characteristics and provide connectivity and adhesion that is non-reversible. A minor amount of one or more other water-miscible solvents, such as ethylene glycol, may be mixed into the PVDF latex to improve freeze-thaw stability.

The two different size polymer particles are generally synthesized separately, then blended in the desired ratio. It is possible to achieve a bimodal particle size distribution useful in the invention in a continuous reaction by means known in the art, such as by changing the temperature, or the initiator type or amount in a delay feed part way through the synthesis reaction.

The large size polymer particle fraction may also be a fluoropolymer, and in one embodiment is also a polyvinylidene fluoride polymer. In one embodiment, the Tg of the large particle is less than that of the small particle—to improve adhesion.

The at least two different size polymer particles can be chemically the same or different, and are preferably compatible for good adhesion. In one embodiment, the polymers are each a polyvinylidene fluoride homopolymer or copolymer. The smaller particle size fraction has a weight average particle size of less than 1.5 micron, preferably less than 1.0 micron, more preferably less than 500 nm, and more preferably less than 300 nm. The small particle size fraction serves primarily as a binder, adhering the inorganic particles to the separator. The small particles are generally discrete particles, though a small amount agglomerates of less than 20 weight percent, preferably less than 10 weight percent, and more preferably less than 5 weight percent may be present.

The large particle size fraction has an average particle size of greater than 1.5 micrometers, preferably from 2 to 20 micrometers and most preferably from 3 to 10 micrometers. This particle size could either be for individual polymer particles, or may be the average particle size of agglomerates of smaller particles. The larger sized particles are used primarily to provide a rough coating surface, and less for adhesion or thermal stability. In one embodiment, the large polymer particles have a lower Tg and/or lower crystallinity than the small particle fraction polymers for better adhesion.

The particle size distribution within each polymer fraction is preferably narrow, with at least 60 percent, and preferably at least 80 percent of the particles being less than plus or minus 20 percent from the average particle size. If the particle size distribution is wide, the particle packing, and amount of void space between particles will decrease— leading to lower porosity of the coating. Therefore, while a multi-modal particle size distribution is possible, it is preferred that the particle size distribution be bi-modal, with a narrow particle size distribution.

In the dried polymer coating, 0.5 to 50 percent of the coating surface will be the large particles sticking beyond the surface, more preferably 1 to 20 area percent, and most preferably 1 to 10 percent of the surface area being the large particles.

Generally, the weight percent of the small polymer particle fraction is larger than that of the large particle weight fraction, based on the total amount of polymer particles. more preferably the weight ratio of small to large particle is 2:1 and more preferably 3:1.

Inorganic Particles

Optionally the separator coating contains electrochemically stable inorganic particles. While a separator coating could be used with primarily polymer binder and little or no inorganic particles, in a preferred embodiment the coating contains electrochemically stable particles. Preferably, the inorganic particles make up the largest volume percent of the separator coating composition. The inorganic particles provide mechanical stability to the separator. The particles could be spherical, but are more often irregular in shape.

The inorganic particles in the coating composition permit an interstitial volume to be formed among them, thereby serving to form micropores and to maintain the physical shape as a spacer. Additionally, because the inorganic particles are characterized in that their physical properties are not changed even at a high temperature of 200° C. or higher, the coated separator using the inorganic particles has excellent heat resistance. The inorganic particles may be in the form of particles or fibers. Mixtures of these are also anticipated.

The inorganic materials, must be electrochemically stable (not subjected to oxidation and/or reduction at the range of drive voltages). Moreover, the inorganic materials preferably have a high ion conductivity. Materials of low density are preferred over higher density materials, as the weight of the battery produced can be reduced. The dielectric constant is preferably 5 or greater. Useful inorganic particle materials in the invention include, but are not limited to $BaTiO_3$, $Pb(Zr,Ti)O_3$, $Pb_{1-x}La_xZr_yO_3$ ($0<x<1$, $0<y<1$), $PBMg_3Nb_{2/3}PbTiO_3$, hafnium ($HfO$, $HfO_2$), $SrTiO_3$, $SnO_2$, $CeO_2$, $MgO$, $NiO$, $CaO$, $ZnO$, $Y_2O_3$, $Al_2O_3$, $TiO_2$, $SiO_2$, $SiC$, $ZrO_2$, boron silicate, $BaSO_4$, nano-clays, ceramics, or mixtures thereof. Useful organic fibers, include, but are not limited to aramid fillers and fibers, polyetherether ketone and polyetherketone ketone fibers, PTFE fibers, and nanofibers.

In one embodiment, the particles or fibers may be surface treated, chemically (such as by etching or functionalization), mechanically, or by irradiation (such as by plasma treatment).

The inorganic particles preferably have an average diameter of 0.001-10 microns. Preferably fibers have diameters below 1 micron, and fiber overlap does not amount to more than about 4-5 microns in thickness. When the size is less than 0.001 micron the particles have poor dispersibility. When the size is greater than 10 microns the coating has an increased thickness under the same solid content, resulting in degradation in mechanical properties. Furthermore, excessively large pores may increase a possibility of internal short circuit being generated during repeated charge/discharge cycles.

The inorganic particles are present in the coating composition at 50 to 99 weight percent, and preferably 60-95 weight percent, based on the total of polymer solids and inorganic particles. When the content of the inorganic materials is less than 50 weight percent, the PVDF binder polymer is present in such a large amount as to decrease the interstitial volume formed among the inorganic particles and thus to decrease the pore size and porosity, resulting in degradation in the quality of a battery. In order to avoid this problem, the total solid content of the coating can be adjusted to a lower level. When the content of the inorganic particles is greater than 99 weight percent, the polymer content is too low to provide sufficient adhesion among the particles, resulting in degradation in mechanical properties of a finally formed coated separator.

Other Additives:

The coating composition of the invention may further contain effective amounts of other additives, including but not limited to fillers, leveling agents, anti-foaming agents, pH buffers, and other adjutants typically used in waterborne formulation while meeting desired separator requirements.

In an aqueous slurry coating composition of the invention, could further have anti-settling agents, wetting agents, thickeners or rheology modifiers, and fugitive adhesion promoters.

Anti-settling agents and/or surfactants could be present at 0 to 10 parts, preferably from 0.1 to 10 parts, and more preferably 0.5 to 5 parts of one or more per 100 parts of water. In one embodiment the level of anti-settling agent or surfactant is from 2.7 to 10 parts per 100 parts of water. These anti-settling agents or surfactants are added to the PVDF dispersion post-polymerization, generally to improve the shelf stability, and provide additional stabilization during slurry preparation. Also during the polymerization process, the surfactant/anti-settling agent used in this invention could be added all upfront prior to polymerization, fed continuously during the polymerization, fed partly before and then during polymerization, or fed after polymerization started and progressed for a while.

Useful anti-settling agents include, but are not limited to, ionic substances, such as salts of alkyl sulfates, sulfonates, phosphates, phophonates (such as sodium lauryl sulfate and ammonium lauryl sulfate) and salts of partially fluorinated alkyl sulfates, carboxylates, phosphates, phosphonates (such as those sold under the CAPSTONE brandname by DuPont), and non-ionic surfactants such as the TRITON X series (from Dow) and PLURONIC series (from BASF). In one embodiment, only anionic surfactants are used. It is preferred that no fluorinated surfactants are present in the composition, either residual surfactant from the polymerization process, or added post-polymerization in forming or concentrating an aqueous dispersion.

Wetting agents could be present in the coating composition slurry at 0 to 5 parts, preferably from 0 to 3 parts of one or more wetting agents per 100 parts of water. Surfactants can serve as wetting agents, but wetting agents may also include non-surfactants. In some embodiments, the wetting agent can be an organic solvent. The presence of optional wetting agents permits uniform dispersion of powdery material(s) into aqueous dispersion of vinylidene fluoride polymer. Useful wetting agents include, but are not limited to, ionic and non-ionic surfactants such as the TRITON series (from Dow) and the PLURONIC series (from BASF), BYK-346 (from BYK Additives) and organic liquids that are compatible with the aqueous dispersion, including but not limited to NMP, DMSO, and acetone.

Thickeners and/or rheology modifiers may be present in the coating composition at from 0 to 10 parts, preferably from 0 to 5 parts of one or more thickeners or rheology modifiers per 100 parts of water. Addition of water-soluble thickener or rheology modifier to the above dispersion prevents or slows down the settling of powdery materials while providing appropriate slurry viscosity for a casting process. Useful thickeners include, but are not limited to the ACRYSOL series (from Dow Chemical); partially neutralized poly (acrylic acid) or poly (methacrylic acid) such as CARBOPOL from Lubrizol; and carboxylated alkyl cellulose, such as carboxylated methyl cellulose (CMC). Adjustment of the formulation pH can improve the effectiveness of some of the thickeners. In addition to organic rheology modifiers, inorganic rheology modifiers can also be used alone or in combination. Useful inorganic rheology modifiers include, but are not limited to, inorganic rheology modifiers including but not limited to natural clays such as montmorillonite and bentonite, manmade clays such as laponite, and others such as silica, and talc.

A fugitive adhesion promoter is preferably present to produce the adhesion needed in coatings formed from the composition of the invention. By "fugitive adhesion promoter", as used herein, is meant an agent that increases the adhesion of the composition after coating on the porous substrate. The fugitive adhesion promoter is then capable of being removed from the formed substrate generally by evaporation (for a chemical) or by dissipation (for added energy).

The fugitive adhesion promoter can be a chemical material, an energy source combined with pressure, or a combination, used at an effective amount to cause interconnectivity of the components of the aqueous composition during coating formation. For chemical fugitive adhesion promoters, the composition contains 0 to 150 parts, preferably 1 to 100 parts, and more preferably from 2 to 30 parts, of one or more fugitive adhesion promoters per 100 parts of water. Preferably this is an organic liquid, that is soluble or miscible in water. This organic liquid acts as a plasticizer for PVDF particles, making them tacky and capable of acting as discrete adhesion points during the drying step. The PVDF polymer particles are able to soften, flow and adhere to separator and optionally the powdery materials during manufacture, resulting in separator coatings with high adhesion and connectivity that are non-reversible. In one embodiment the organic liquid is a latent solvent, which is a solvent that does not dissolve or substantially swell PVDF resin at room temperature, but will solvate the PVDF resin at elevated temperatures. In one embodiment a useful organic solvent is N-methyl-2-pyrrolidone. Other useful fugitive adhesion promoter agents include, but are not limited to, dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea.

Porous Separator

A porous separator is coated on at least one side with the coating composition. There is no particular limitation in choosing the separator substrate that is coated with the aqueous coating composition of the invention, as long as it is a porous substrate having pores. Preferably the substrate is a heat resistant porous substrate having a melting point of greater than 200° C. Such heat resistant porous substrates can improve the thermal safety of the coated separator under external and/or internal thermal impacts.

The porous substrate may take the form of a membrane, or fibrous web. When the porous substrate is fibrous, it may be a nonwoven web forming a porous web, such as a spunbond or melt blown web.

Examples of porous substrates useful in the invention as the separator include, but are not limited to: polyolefins, polyethylene terephthalate, polybutylene terephthalate, polyester, polyacetal, polyamide, polycarbonate, polyimide, polyetherether ketone, polyether sulfone, polyphenylene oxide, polyphenylene sulfidro, polyethylene naphthalene or mixtures thereof. However, other heat resistant engineering plastics may be used with no particular limitation. Nonwoven materials of natural and synthetic materials may also be used as the substrate of the separator.

The porous substrate generally has a thickness of from 1 micron to 50 microns, and are typically cast membranes of non-wovens. The porous substrate preferably has a porosity of between 5% and 95%. The pore size (diameter) preferably ranges from 0.001 micron to 50 microns, more preferably from 0.01 micron to 10 microns. When the pore size and porosity are less than 0.01 micron and 5%, respectively, the porous substrate may function as resistance layer. When the pore size and porosity are greater than 50 microns and 95%, respectively, it is difficult to maintain mechanical properties.

In an alternative embodiment of the invention, a coating composition having at the least two different particle size distributions (<1.5 micron, and >1.5 microns) may be present on an electrode to form an uneven morphology. Generally, the coated electrodes in the battery are calendared to compress the coatings—creating a smooth surface. However, an additional thin bimodal polymer particle coating, with or without inorganic particles, could be placed on top of the calendared electrode coating to create an uneven electrode surface, and thereby provide void space between the electrodes and separator. In one embodiment separators and electrodes could both be coated with the bi-modal coating composition of the invention to crate void space for electrode expansion.

Coating Method

The aqueous coating composition is applied onto at least one surface of a porous substrate by means known in the art, such as by brush, roller, ink jet, dip, knife, gravure, wire rod, squeegee, foam applicator, curtain coating, vacuum coating, or spraying. The coating is then dried onto the separator at room temperature, or at an elevated temperature. The final dry coating thickness is from 0.5 to 15 microns, preferably from 1 to 8 microns, and more preferably from 2 to 4 microns in thickness.

The separators of the invention can be used to form an electrochemical device, such as a battery, capacitor, electric double layer capacitor, membrane electrode assembly (MEA) or fuel cell, by means known in the art. A nonaqueous-type battery can be formed by placing a negative electrode and positive electrode on either side of the coated separator.

EXAMPLES

Example 1: Small Fluoropolymer Particles

Figure 2:
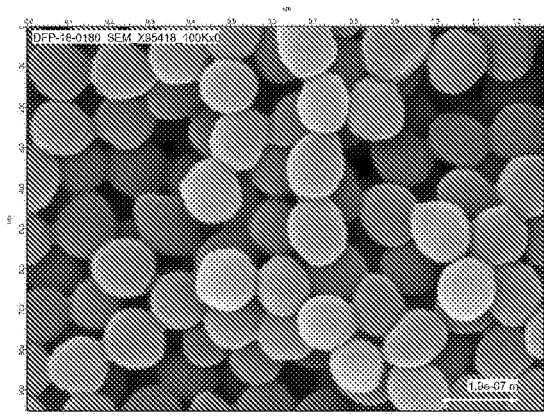
FIG. 2 depicts the weight average particle size, measured by Nicomp 380, laser light scattering and SEM.
Figure 3:
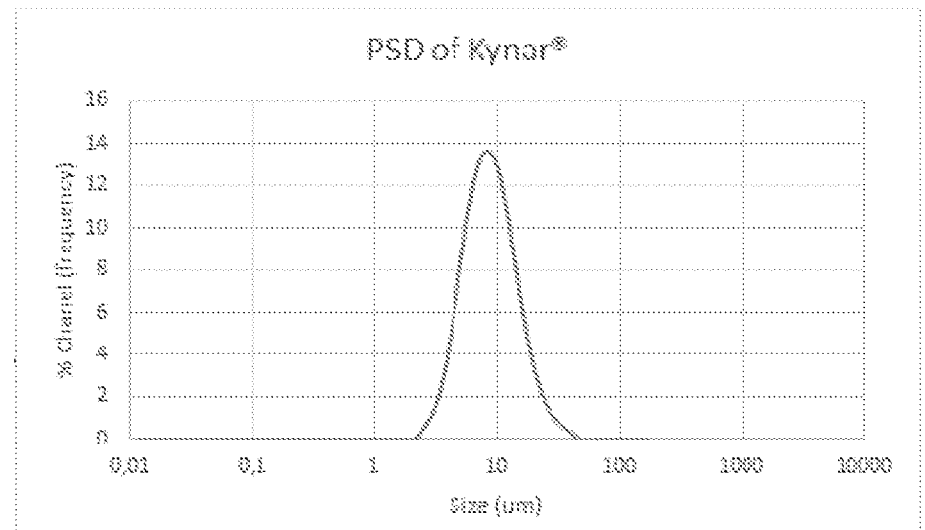
FIG. 3 depicts the particle distribution of Example 2.

Into an 80-gallon stainless steel reactor was charged, 345 lbs of deionized water, 66 grams of a poly(ethylene glycol)-block-poly(propylene glycol)-block-poly(ethylene glycol) non-ionic surfactant having a Mn of about 2,900 g/mol., and 3.0 lbs of 10% aqueous solution NOVERITE as chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass along with 5.2 lbs of 10% aqueous solution NOVERITE K-752. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 sec-1 to be 430 cp. The weight average particle size was 200±20 nm, measured by Nicomp 380, laser light scattering and SEM (FIG. 2). The melting temperature and heat of fusion of resin were measured in accordance with ASTM method D-3418.

Example 2: Large Fluoropolymer Particles

Into an 80-gallon stainless steel reactor was charged, 345 lbs of deionized water, 250 grams of PLURONIC 31R1 (non-fluorinated non-ionic surfactant from BASF), and 0.35 lbs of ethyl acetate. Following evacuation, agitation was begun at 23 rpm and the reactor was heated. After the reactor temperature reached the desired set point of 100° C., the VDF and HFP monomer were introduced to reactor with HFP ratio of 13.2 wt % of total monomers. Reactor pressure was then raised to 650 psi by charging approximately 35 lbs total monomers into the reactor. After reactor pressure was stabilized, 3.5 lbs of initiator solution made of 1.0 wt % potassium persulfate and 1.0 wt % sodium acetate were added to the reactor to initiate polymerization. Upon initiation, the ratio of HFP to VDF was so adjusted to arrive at 4.4% HFP to total monomers in the feed. The rate of further addition of the initiator solution was also adjusted to obtain and maintain a final combined VDF and HFP polymerization rate of roughly 90 pounds per hour. The VDF and HPF copolymerization was continued until approximately 160 pounds of monomers were introduced in the reaction mass. The HFP feed was stopped but VDF feed continued till approximately 180 lbs of total monomers were fed to the reactor. The VDF feed was stopped and the batch was allowed to react-out at the reaction temperature to consume residual monomer at decreasing pressure. After 40 minutes, the initiator feed and agitation were stopped and the reactor was cooled, vented and the latex recovered. Solids in the recovered latex were determined by gravimetric technique and were about 32 weight % and melt viscosity of about 38 kp according to ASTM method D-3835 measured at 450° F. and 100 sec-1. The melting temperature of the resin was measured in accordance with ASTM method D-3418 and was found to be about 152° C. The weight average particle size was measured by NICOMP laser light scattering instrument and was found to be about 160 nm.

The latex was spray dried into powder form for storage. The powder was dispersed into water and analysis of particle size revealed that the particle size distribution is very uniform with weight average particle size of 8-9 micron.

Example 3: Large Non-Fluoropolymer Particles

Fine powder Orgosol® of polyamide from Arkema is used as the larger polymer particle fraction having a weight average particle size of greater than 1.5 micron.

Example 4: Coated PE Separators

Three different combinations of polymers with large and small particle size are used to coat PE separators. Batteries are made with the PE separators and Cyclability tests are run. The cell performance is tabulated in table 1.

| Example number | Coating | Surface Quality | Battery Cyclability |
|---|---|---|---|
| 4A Invention | (mixture of large and small particles) | Non-Uniform | Excellent |
| 4B Control | Counter Example 1 (small particle only) | Uniform | Good |
| 4C control | Counter Example 2 (Large particles only) | Uniform | Good |

What is claimed is:

1. A porous separator for an electrochemical device, having directly coated thereon a dried coating composition having an uneven surface, wherein said dried coating composition comprises:
   a) discrete polymer particles of at least two different weight average particle sizes, one smaller polymer particle fraction having an average particle size of less than 1.5 micron, the other larger polymer particle fraction having a weight average particle size of greater than 1.5 microns; wherein said large particles have a lower Tg than the smaller particles, wherein said large and small polymer particles are each independently selected from the group consisting of fluoropolymers, polyamides, polyether ether ketone, polyether ketone ketone, polyesters, and poly(meth)acrylates; and
   b) optionally inorganic, electrochemically stable particles.

2. The porous separator of claim 1, wherein the smaller polymer particle fraction has an average particle size of less than 1.0 micron, the other larger polymer particle fraction has a weight average particle size of greater than 2.0 microns.

3. The porous separator of claim 1, wherein the ratio of the less than 1.5 micron particles to the greater than 1.5 micron particles is at least 1:1.

4. The porous separator of claim 1, wherein said large and small polymer particles are the same or different chemistries.

5. The porous separator of claim 1, wherein the smaller particles comprise homopolymers or copolymers of polyvinylidene fluoride.

6. The porous separator of claim 1, wherein both said large and said small polymer particles are polyvinylidene fluoride homopolymers or copolymers comprising at least 70 weight percent of vinylidene fluoride monomer units.

7. The porous separator of claim 1, wherein said small particles have a weight average particle size of from 20 nm to 500 nm.

8. The porous separator of claim 1, wherein said small particles comprise functional polyvinylidene fluoride.

9. The porous separator of claim 1, wherein said dried coating composition has 0.5 to 50 area percent of the surface comprising large particles.

10. The porous separator of claim 1, wherein electrochemically stable inorganic particles are present at from 50 to 99 weight percent based on the total of polymer solids and inorganic particles, and said inorganic particles are selected from the group consisting of $BaTiO_3$, $Pb(Zr,Ti)O_3$, $Pb_{1-x}La_xZr_yO_3$ ($0<x<1$, $0<y<1$), $PBMg_3Nb_{2/3}$, $PbTiO_3$, hafnium (HfO, $HfO_2$), $SrTiO_3$, $SnO_2$, $CeO_2$, MgO, NiO, CaO, ZnO, $Y_2O_3$, $Al_2O_3$, $TiO_2$, $SiO_2$, SiC, $ZrO_2$, boron silicate, $BaSO_4$, nano-clays, ceramics, or and mixtures thereof.

11. The porous separator of claim 1, wherein said dry separator coating has a thickness of from 0.5 to 15 microns.

12. A battery, capacitor, electric double layer capacitor, membrane electrode assembly (MEA) or fuel cell comprising the porous separator of claim 1.

* * * * *